US008792130B2

(12) United States Patent
Kurigata

(10) Patent No.: US 8,792,130 B2
(45) Date of Patent: Jul. 29, 2014

(54) IMAGE PROCESSING APPARATUS FOR CARRYING OUT ENLARGEMENT/REDUCTION OF IMAGE AND IMAGE PROCESSING METHOD FOR THE SAME

(75) Inventor: Yuhei Kurigata, Hino (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 10 days.

(21) Appl. No.: 13/608,840

(22) Filed: Sep. 10, 2012

(65) Prior Publication Data

US 2013/0070308 A1 Mar. 21, 2013

(30) Foreign Application Priority Data

Sep. 15, 2011 (JP) ................................. 2011-201912

(51) Int. Cl.
*H04N 1/405* (2006.01)
(52) U.S. Cl.
USPC ............ 358/1.2; 358/3.06; 358/451; 358/468
(58) Field of Classification Search
USPC ................ 358/1.2, 3.06–3.09, 451, 468, 448; 382/298–300, 194, 192
See application file for complete search history.

(56) References Cited

U.S. PATENT DOCUMENTS

| 5,535,007 | A | * | 7/1996 | Kim ............................. | 358/296 |
| 5,717,789 | A | * | 2/1998 | Anderson et al. ............. | 382/254 |
| 7,064,862 | B2 | * | 6/2006 | Takashimizu .................. | 358/1.9 |
| 7,257,274 | B2 | * | 8/2007 | Brothers et al. .............. | 382/298 |
| 2008/0089585 | A1 | | 4/2008 | Yashima et al. | |
| 2011/0157607 | A1 | | 6/2011 | Saito | |

FOREIGN PATENT DOCUMENTS

| DE | 19630009 A1 | * | 1/1998 |
| JP | 09160149 A | * | 6/1997 |
| JP | 10-257305 | | 9/1998 |
| JP | 2006-270149 | | 10/2006 |
| JP | 2008-099114 | | 4/2008 |
| JP | 2011-135387 | | 7/2011 |

* cited by examiner

*Primary Examiner* — Thomas D Lee
*Assistant Examiner* — Stephen M Brinich
(74) *Attorney, Agent, or Firm* — Holtz Holtz Goodman & Chick PC

(57) ABSTRACT

Disclosed is an image processing apparatus including: an operation pixel arrangement unit to arrange the operation pixels to be inserted or deleted in a staggered form from one end of the image to the other end of the image in the second direction, so as to satisfy a first condition in which a distance in the first direction between the operation pixels adjacent in the second direction is 2 pixels or more and less than the predetermined number of pixels, and a second condition in which a direction in which the operation pixels adjacent in the second direction are apart from each other is reversed at intervals of not more than 2 pixels which are consecutive in the second direction; and an image enlargement/reduction unit to enlarge or reduce the image by inserting or deleting the operation pixels arranged by the operation pixel arrangement unit.

12 Claims, 20 Drawing Sheets

INSERTED PIXEL POSITION DETERMINING METHOD ACCORDING TO EMBODIMENT

ONE EXAMPLE FOR SHOWING CASE THAT DIRECTION IS REVERSED
BETWEEN PLUS AND MINUS BY ONE DOT

DETERMINE INPUT IMAGE

DETERMINE DUMMY PIXEL INSERTING POSITIONS

SHIFT POSITION OF PIXEL BY INSERTING DUMMY PIXEL

INSERT PIXEL MATCHING PERIPHERAL PIXELS IN POSITION OF DUMMY PIXEL

PIXEL INSERTING PROCESS BY USING NEAREST NEIGHBOR ALGORITHM
FIG.14A
ORIGINAL IMAGE
FIG.14B
IMAGE AFTER INSERTING PIXELS
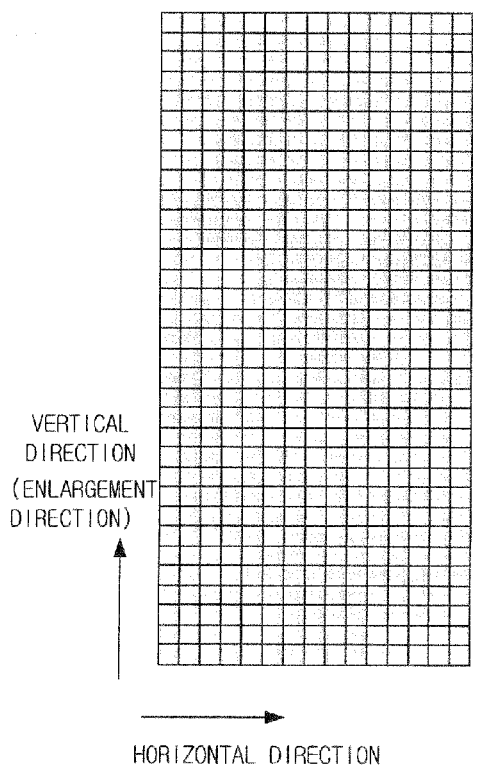
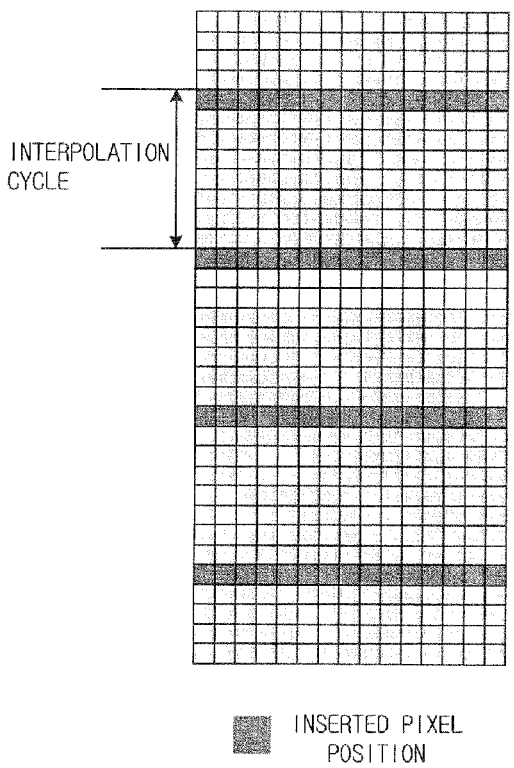
INTERPOLATION CYCLE
VERTICAL DIRECTION (ENLARGEMENT DIRECTION)
HORIZONTAL DIRECTION
INSERTED PIXEL POSITION

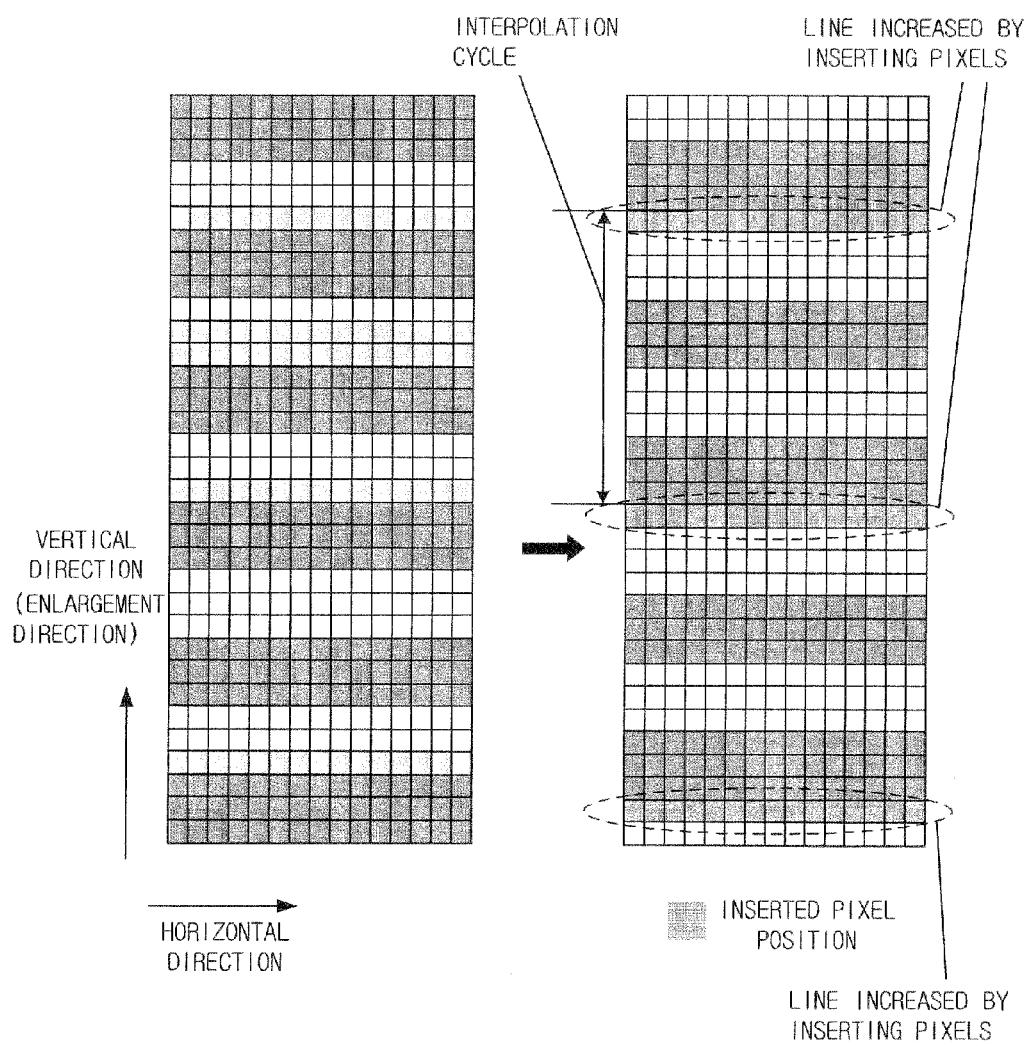

ORIGINAL IMAGE

IMAGE AFTER INSERTING
PIXELS BY USING
PSEUDORANDOM NUMBERS

VERTICAL
DIRECTION
(ENLARGEMENT
DIRECTION)

HORIZONTAL
DIRECTION

INSERTED PIXELS

ORIGINAL IMAGE

IMAGE AFTER
INSERTING PIXELS AS
SHOWN IN FIG. 18

VERTICAL
DIRECTION
(ENLARGEMENT
DIRECTION)

HORIZONTAL
DIRECTION

UNEVENNESS WITH
RESPECT TO LINES IS
VISUALLY RECOGNIZED
EASILY

INSERTED PIXEL
POSITION

FIG.20A
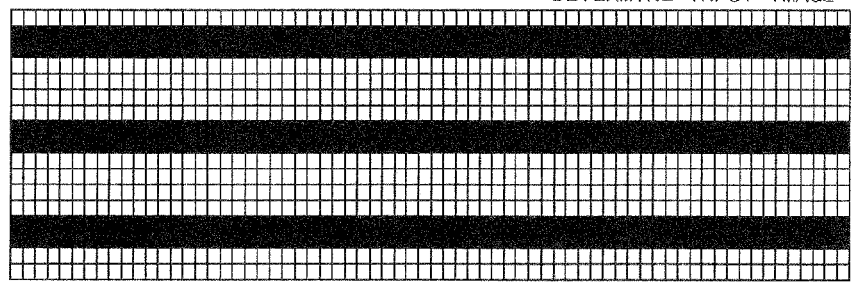
DETERMINE INPUT IMAGE
FIG.20B
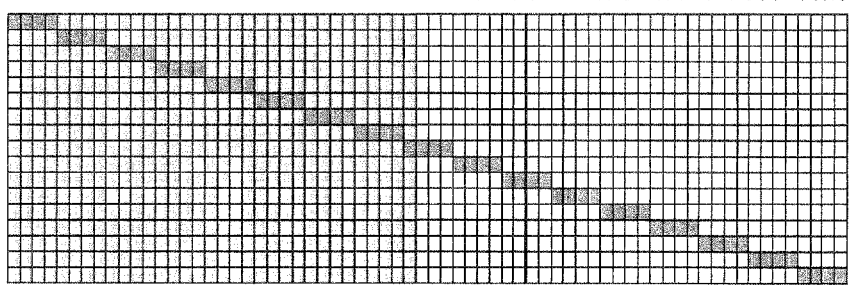
DETERMINE DUMMY PIXEL INSERTING POSITIONS
FIG.20C
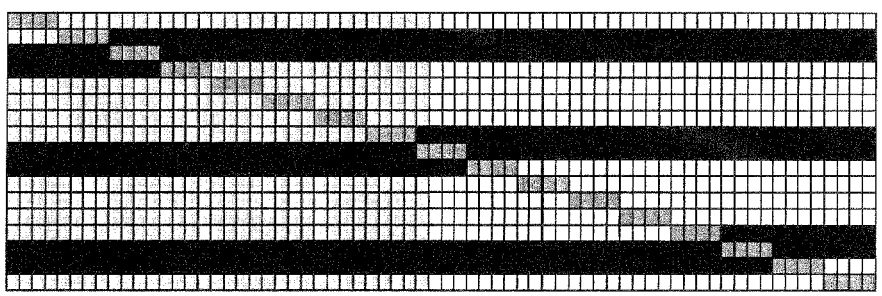
SHIFT POSITION OF PIXEL BY INSERTING DUMMY PIXEL
FIG.20D
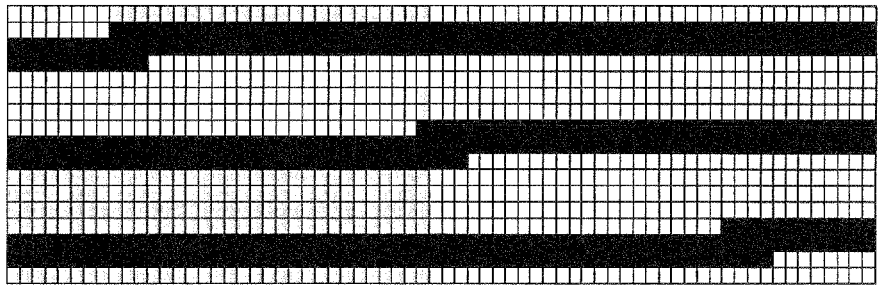
INSERT PIXEL MATCHING PERIPHERAL PIXELS IN POSITION OF DUMMY PIXEL
 INSERTED PIXEL POSITION

IMAGE PROCESSING APPARATUS FOR CARRYING OUT ENLARGEMENT/REDUCTION OF IMAGE AND IMAGE PROCESSING METHOD FOR THE SAME

BACKGROUND OF THE INVENTION

1. Field of the Invention

The present invention relates to an image processing apparatus and an image processing method for carrying out the fine enlargement/reduction of an image.

2. Description of Related Art

Conventionally, when the image processing apparatus carries out the fine enlargement or the fine reduction of an image in the printing, a method for reducing or enlarging an image so as to limit the number of pixels to be processed in order to maintain the original image quality (maintain the sharpness of an image or the like), for example, a method for inserting or deleting pixels at regular intervals, is used.

In this case, for example, when a dot matrix type of image having pixels arranged in a matrix in two directions perpendicular to each other (one direction is the main scanning direction (or horizontal direction, line direction) and the other is the sub-scanning direction (or vertical direction)) is enlarged or reduced in the sub-scanning direction, in the simple nearest neighbor algorithm, as shown in FIGS. 14A and 14B, the pixels are concurrently inserted in (or deleted from) each line (along the main scanning direction) which is arranged in the interpolation cycle. FIG. 14B shows the example in which the original image shown in FIG. 14A is enlarged in the sub-scanning direction by 8/7 times. In FIG. 14B, pixels constituting one line are inserted at intervals of seven lines.

When the reduction/enlargement is carried out by the above method, the pixel inserting positions or the pixel deleting positions are arranged in each line. Therefore, a certain type of regularity is caused, and the texture is caused. In particular, in an image in which the thin lines are arranged at regular intervals, or in an image for which the screen treatment has been carried out, the shift of the lines, the density ununiformity and the like are markedly caused as the texture. For example, when the original image having the stripe pattern shown in FIG. 15A is enlarged by the method shown in FIGS. 14A and 14B, the texture in which the stripe lines periodically become thick is markedly caused as shown in FIG. 15B. Therefore, various technologies for obscuring the above texture have been proposed.

For example, the technology for determining the pixel inserting positions by using the pseudorandom numbers is disclosed (See Japanese Patent Application Publication No. 2008-99114). For example, FIG. 16 shows an example of the arrangement of the pixel inserting positions determined by the pseudorandom numbers. In the above nearest neighbor algorithm, the inserted pixels constituting one line in the main scanning direction are arranged in the interpolation cycle. On the other hand, in FIG. 16, each inserted pixel corresponding to one line is distributed in the sub-scanning direction by the pseudorandom numbers at random within the interpolation cycle. When the pixel inserting positions are distributed by the pseudorandom numbers at random, the regularity of the pixel inserting positions is lost. Therefore, it is possible to prevent the texture from being caused as compared with the above nearest neighbor algorithm.

However, in the method disclosed in Japanese Patent Application Publication No. 2008-99114, when the pixel inserting positions are determined by the pseudorandom numbers, there is some possibility that two pixel inserting positions which are adjacent in the main scanning direction are largely apart from each other in the sub-scanning direction. In an example shown in FIGS. 17A and 17B (FIG. 17A shows the original image and FIG. 17B shows the image in which the pixels are inserted in accordance with the pseudorandom numbers), the inserted pixel 31a and the inserted pixel 31b are largely apart from each other in the sub-scanning direction as shown in the part enclosed by a dashed line 32. In this part, because the discontinuity of the image is widely caused in the sub-scanning direction, the texture, such as the local density deterioration which forms longitudinal lines (white lines) is caused.

In order to solve the above problem, it is considered that the distance between two pixel inserting positions which are adjacent in the main scanning direction is limited within a certain range so as to prevent the two pixel inserting positions from being largely apart from each other in the sub-scanning direction. However, when only the above distance is limited within a certain range, another type of image quality deterioration is caused. FIG. 18 shows an example in which the inserted pixels are arranged. In FIG. 18, the distance in the sub-scanning direction between two pixel inserting positions which are adjacent in the main scanning direction is fixed to two pixels and the sub-scanning direction in which the two pixel inserting positions are apart from each other is reversed between the plus direction and the minus direction at intervals of four pixels in the main scanning direction.

FIG. 19A shows the original image having the horizontal stripes. FIG. 19B shows the image obtained by enlarging the original image of FIG. 19A so as to arrange the inserted pixels by fixing the distance in the sub-scanning direction between two pixel inserting positions which are adjacent in the horizontal direction (main scanning direction), to two pixels without reversing the sub-scanning direction in which the two pixel inserting positions are apart from each other. In the example of FIG. 19B, the discontinuity which is visually recognized as the unevenness with respect to the horizontal line is caused. FIGS. 20A to 20D also show the similar example. FIG. 20A shows the original image having the horizontal stripes. FIG. 20B shows the pixel inserting positions. In FIG. 20B, the pixel inserting positions are arranged so as to ramp down the pixel inserting positions from the left upper portion of the image by one pixel at intervals of four pixels in the horizontal direction. FIG. 20C shows the state in which the dummy pixels are inserted into the pixel inserting positions of FIG. 20B in the original image of FIG. 20A. FIG. 20D shows the final enlarged image which is obtained by determining the pixel value of each dummy pixel in accordance with the peripheral pixels thereof. In the example of FIGS. 20A to 20D, the texture in which the unevenness is formed with respect to the horizontal line is caused.

SUMMARY

To achieve at least one of the abovementioned objects, an image processing apparatus reflecting one aspect of the present invention, which enlarges or reduces an image in a first direction by inserting operation pixels in the image or by deleting operation pixels from the image, the image having a dot matrix format in which pixels are arranged in the first direction and in a second direction which is perpendicular to the first direction, and comprises:

an operation pixel arrangement unit to arrange the operation pixels to be inserted or deleted in a staggered form from one end of the image to the other end of the image in the second direction, so as to satisfy a first condition in which a distance in the first direction between the operation pixels adjacent in the second direction is 2 pixels or more and less than the predetermined number of pixels, and a second condition in which a direction in which the operation pixels adjacent in the second direction are apart from each other is reversed at intervals of not more than 2 pixels which are consecutive in the second direction; and an image enlargement/reduction unit to enlarge or reduce the image by inserting or deleting the operation pixels arranged by the operation pixel arrangement unit.

Preferably, a range in which the operation pixels are arranged in the staggered form in the first direction is determined within an insertion/deletion cycle in which the operation pixels are inserted or deleted in the first direction, wherein the insertion/deletion cycle corresponds to an enlargement/reduction ratio of the image.

Preferably, each operation pixel is arranged so as to slope a central line of a macroscopic arrangement of the operation pixels from the one end of the image to the other end of the image in the second direction or so as to wave the central line of the macroscopic arrangement of the operation pixels in a period which is longer than a period of the staggered form.

Preferably, a slope of the central line of the macroscopic arrangement is not coincident with a screen angle of the image, or each slope angle of the waved central line of the macroscopic arrangement is not coincident with the screen angle of the image.

Preferably, the predetermined number of pixels is a value corresponding to a resolution of the image.

Preferably, an upper limit of the predetermined number of pixels is set to the number of pixels, which is calculated from the resolution of the image so as to satisfy a ratio of the number of pixels of 80 pixels to the resolution of the image of 1200 dpi.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIGS. 14A and 14B are explanatory views showing the pixel inserting positions in accordance with a conventional nearest neighbor algorithm;

FIG. 15A is an example of the original image and FIG. 15B is an example of the image which is enlarged in accordance with the conventional nearest neighbor algorithm;

FIGS. 20A to 20D are explanatory views showing the specific example of the case in which the image is finely enlarged by the conventional method.

DETAILED DESCRIPTION OF PREFERRED EMBODIMENTS

Hereinafter, a preferred embodiment of the present invention will be explained with reference to the accompanying drawings.

Figure 1:
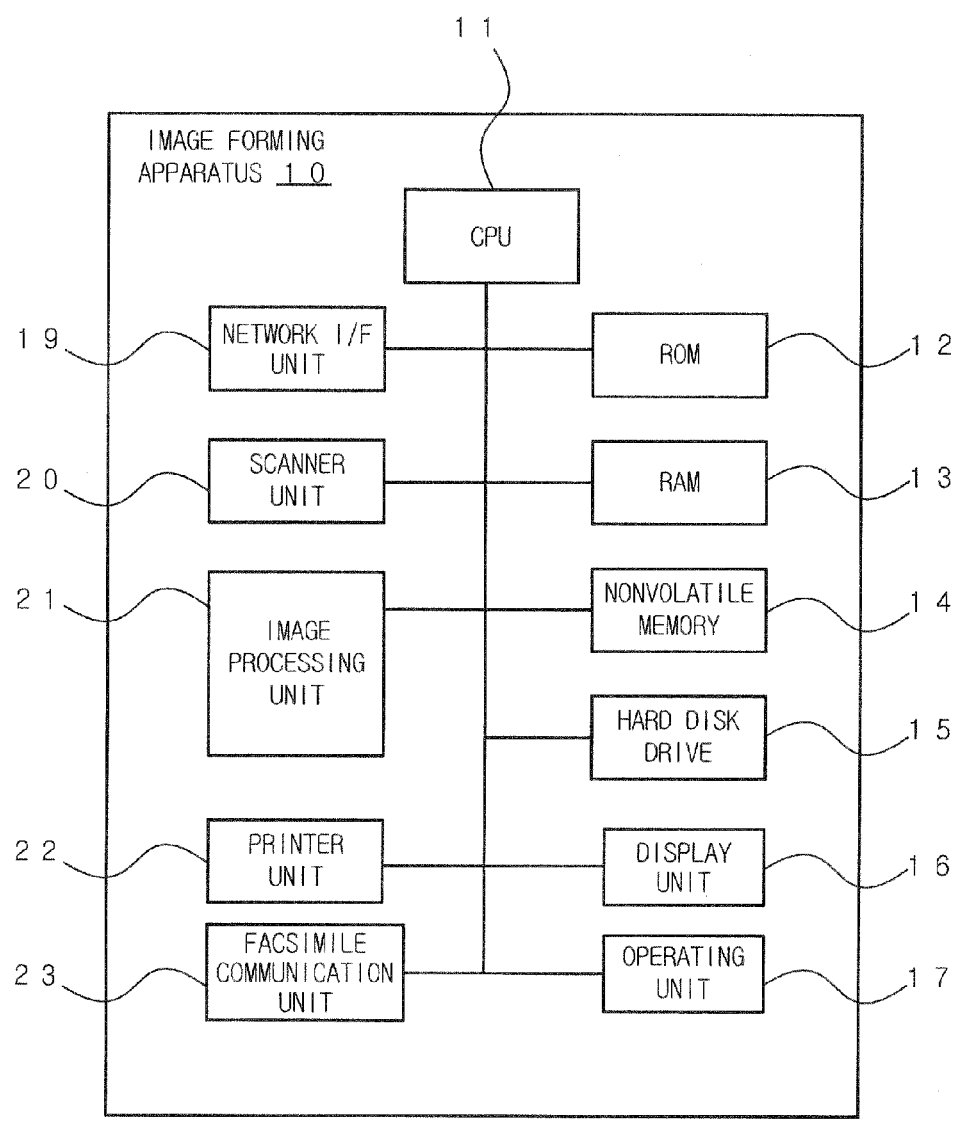
FIG. 1 is a block diagram showing a schematic configuration of the image forming apparatus according to the embodiment.

FIG. 1 shows the schematic configuration of the image forming apparatus 10 as an image processing apparatus for carrying out the image processing method (pixel inserting process) according to the embodiment. The image forming apparatus 10 is a so-called multi-function peripheral having a function to execute jobs, such as a copy job for printing out an image of an original by optically reading the original, a scan job for scanning the original to store the image data of the scanned original as a file or to transmit the image data to an external device, a print job for printing out an image based on the data received from a PC (Personal Computer), on recording paper.

Further, the image forming apparatus 10 has a function to enlarge or reduce an image in the main scanning direction and the sub-scanning direction by inserting or thinning (deleting) the pixels. In the embodiment, the operation for enlarging or reducing the image in the sub-scanning direction (vertical direction), will be explained.

The image forming apparatus 10 comprises a CPU (Central Processing Unit) 11 for controlling the operation of the image forming apparatus 10, a ROM (Read Only Memory) 12, a RAM (Random Access Memory) 13, a nonvolatile memory 14, a hard disk drive 15, a display unit 16, an operating unit 17, a network I/F unit 19, a scanner unit 20, an image processing unit 21, a printer unit 22 and a facsimile communication unit 23 which are connected with the CPU 11.

By the CPU 11, a middleware, application programs and the like are executed on an OS (Operating System) program as a base. In the ROM 12, various types of programs are stored. By executing the processes by the CPU 11 in accordance with these programs, the functions of the image forming apparatus 10, such as the execution of jobs, are realized. The RAM 13 is used as a work memory for temporarily storing various data when the CPU 11 executes the programs and as an image memory for storing image data.

The nonvolatile memory 14 is a rewritable memory (flash memory) in which the contents are stored even if the image forming apparatus 10 is turned off. In the nonvolatile memory 14, the unique information of the image forming apparatus 10, various types of setting information and the like are stored. The hard disk drive 15 is a large-capacity nonvolatile memory device, and is used in order to store the OS program, various application programs, print data, image data, information history for jobs, and the like.

The display unit 16 is configured by a liquid crystal display (LCD) or the like, and has a function to display the contents relating to various operations and settings. The operating unit 17 has a function to receive various types of operations, such as the input of jobs, the change of the settings from the user. The operating unit 17 comprises a touch panel which is provided on the screen of the display unit 16. The touch panel detects a coordinate position in which the user pushes down. Further, the operating unit 17 comprises a numerical keypad, an alphabetical keypad, a start key and the like out of the screen of the display unit 16.

The network I/F unit 19 communicates with another external device or the like which is connected via the network, such as a LAN.

The scanner unit 20 has a function to obtain image data by optically reading an image of an original. For example, the scanner unit 20 comprises a light source for irradiating the original with light, a line image sensor for reading the original line by line in the width direction of the original by receiving the reflected light from the original, a moving unit for sequentially moving the reading position line by line in the longitudinal direction of the original, an optical system having lenses, mirrors and the like for guiding the reflected light from the original to the line image sensor and focusing the reflected light on the line image sensor, a converting unit for converting an analog image signal outputted from the line image sensor into digital image data, and the like.

The image processing unit 21 carries out the rasterization processing for converting print data into image data, compression/decompression processing of image data and the like, in addition to the processings, such as enlargement/reduction and rotation of the image.

The printer unit 22 has a function to form an image based on image data, on recording paper. In this embodiment, the printer unit 22 is configured as the so-called laser printer for forming an image by the electrophotographic process. The laser printer comprises a conveying device for the recording paper, a photoconductive drum, a charging device, a laser unit, a developing device, a transfer and separation device, a cleaning device and a fixing device. The image may be formed by the inkjet system or another system.

The facsimile communication unit 23 controls the operation relating to the facsimile transmission and reception.

Figure 2:
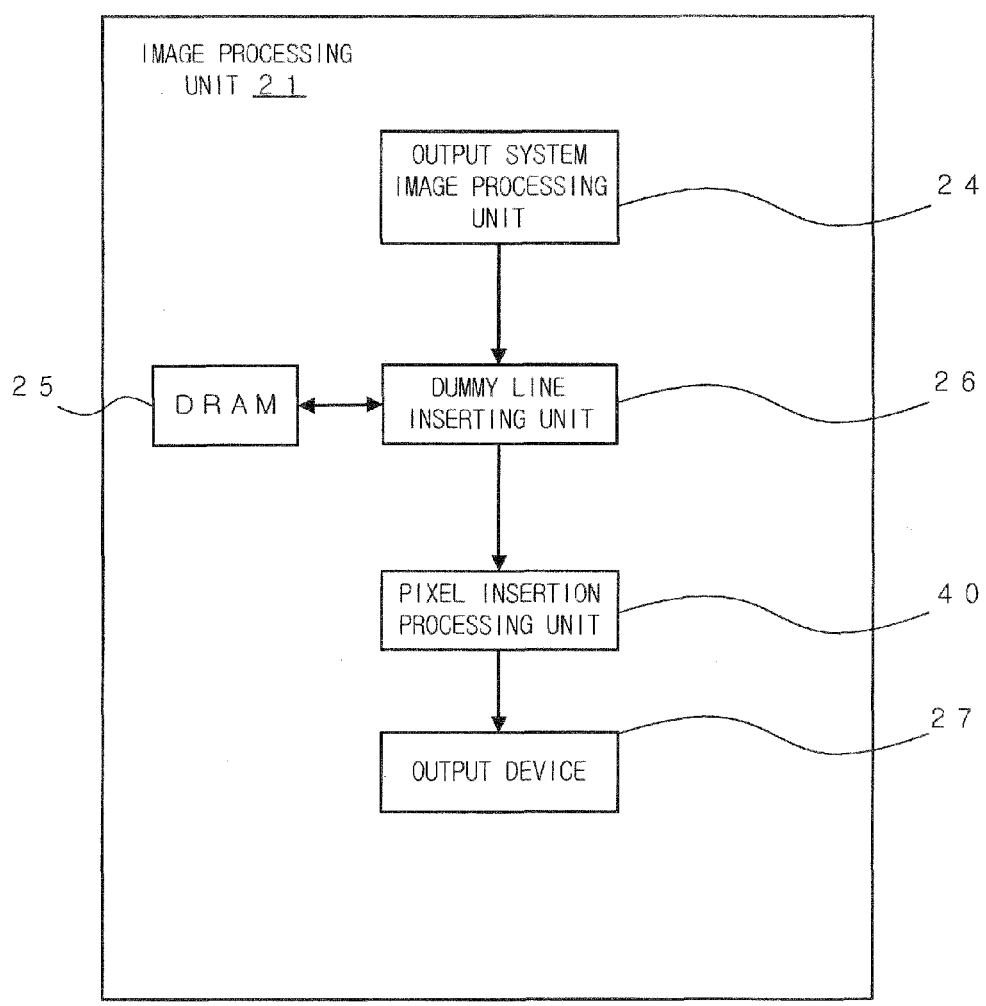
FIG. 2 is a block diagram showing a schematic configuration of the image processing unit.

FIG. 2 shows the schematic configuration of a part of the image processing unit 21, for carrying out the enlargement/reduction process for an image. The part of the image processing unit 21, for carrying out the enlargement/reduction process comprises an output system image processing unit 24, a DRAM (Dynamic Random Access Memory) 25, a dummy line inserting unit 26, a pixel insertion processing unit 40 and an output device 27.

The output system image processing unit 24 carries out the screen treatment for an image to be processed by the enlargement/reduction process, to generate the image prior to the enlargement/reduction process.

The dummy line inserting unit 26 inserts the dummy line having dummy pixels for constituting one line along the main scanning direction, into the image in the sub-scanning direction in accordance with the enlargement ratio of the image at regular intervals (corresponding to the enlargement ratio of the image). The dummy pixels are the inserted pixels having an indefinite pixel value. After each position of the dummy pixels is changed, the pixel values of the dummy pixels are determined in accordance with the pixel values of the peripheral pixels of each dummy pixel, or the like. When the image is reduced, the pixels are not inserted. The pixels to be deleted, which constitute one line along the main scanning direction of the image, are designated in accordance with the reduction ratio of the image. The DRAM 25 is used as a temporary buffer for absorbing the difference in the number of pixels (the number of lines) in the sub-scanning direction between the output image and the input image.

The pixel insertion processing unit 40 changes the position of each pixel (dummy pixel) on the inserted dummy line in the sub-scanning direction and the designated position of each pixel to be deleted in the sub-scanning direction in the image under the predetermined conditions. Then, in case of the dummy pixels, the pixel value of each dummy pixel is set in accordance with the peripheral pixels of the dummy pixel of which the position is changed. In case of the pixels to be deleted, each pixel of which the designated position is changed is deleted. The above processes will be explained. The output device 27 outputs the image data which has been processed by the pixel insertion processing unit 40 to the printer unit 22. The printer unit 22 forms an image based on the above image data.

Next, the enlargement/reduction of the image, which is carried out at the fine enlargement/reduction ratio will be explained. In the embodiment, the case in which the image is finely enlarged in the vertical direction (sub-scanning direction) will be explained.

Figure 3:
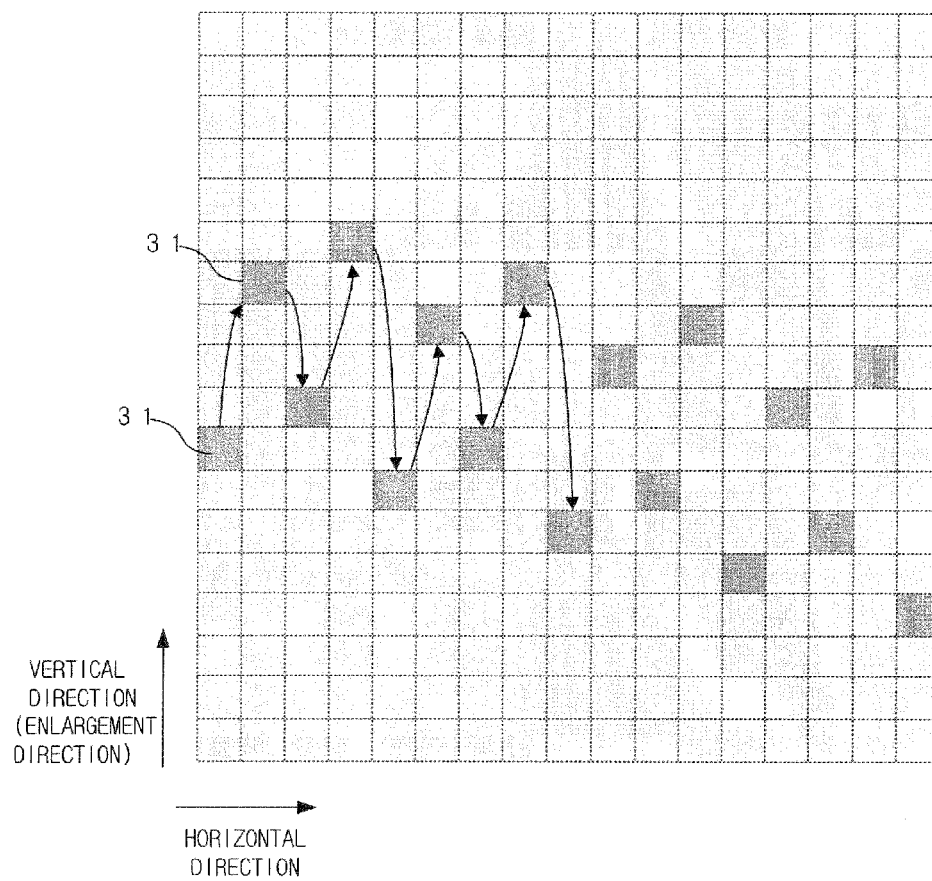
FIG. 3 is an explanatory view showing an example of the arrangement of the pixel inserting positions in case that the pixels are inserted by the image processing method (pixel inserting method) according to the embodiment.

In this embodiment, as shown in FIG. 3, the method for arranging the inserting positions of the dummy pixels 31 in a staggered form so as to satisfy the following two conditions is adopted.

(1) The distance in the vertical direction (sub-scanning direction) between the inserting positions of the adjacent dummy pixels 31 is limited within the predetermined range so as to be not too small and be not too large (in this embodiment, the predetermined range is A pixels or more and less than B pixels.

(2) The direction (plus or minus) in which one dummy pixel is apart from the dummy pixel adjacent to one dummy pixel in the sub-scanning direction is reversed at intervals of n pixels at a maximum (in FIG. 3, one pixel) in the main scanning direction.

FIG. 3 shows an example of the method for arranging the inserted pixels (inserted pixel position determining method) according to the embodiment. The inserted pixels (dummy pixels 31) are arranged in the staggered form as follows. With the movement by one pixel in the horizontal direction (main scanning direction) (in this drawing, with the movement by one pixel from left to right), the vertical direction (sub-scanning direction) in which one adjacent inserted pixel positioned on the right side of the target pixel is apart from the target pixel is reversed between the plus direction (in this drawing, the upper direction) and the minus direction (in the drawing, the lower direction). As described above, the arrangement having the staggered form in which the vertical direction is reversed between the plus direction and the minus direction by one pixel is preferable in the embodiment.

Figure 4A:
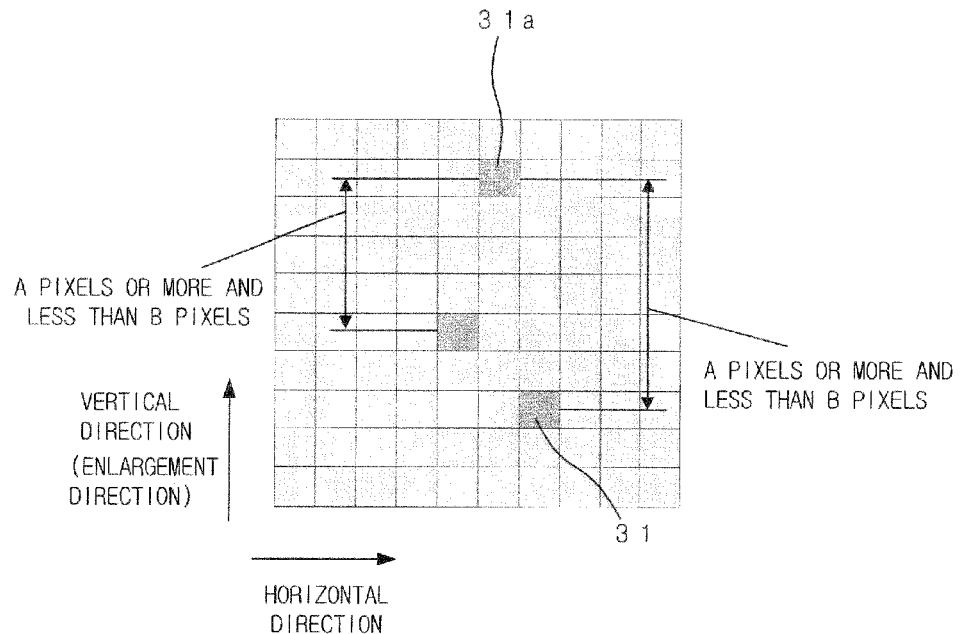
FIGS. 4A and 4B are explanatory views showing the positional relation among three consecutive inserted pixels in the pixel inserting positions shown in FIG. 3.
Figure 4B:
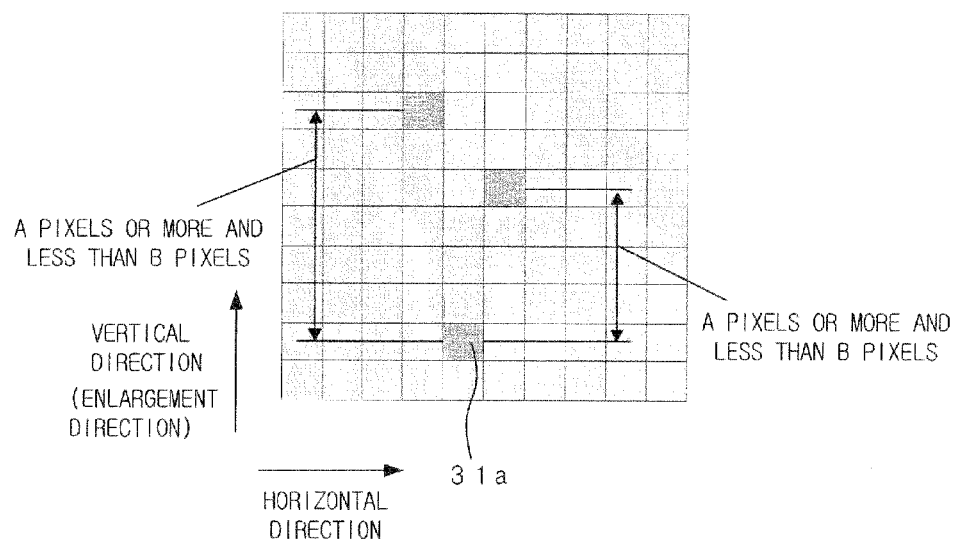

FIGS. 4A and 4B show each position of three pixels which are consecutive in the horizontal direction, in the arrangement of the dummy pixels 31 shown in FIG. 3. The distance in the vertical direction (sub-scanning direction) between the two pixels adjacent in the horizontal direction (main scanning direction) is necessarily A pixels or more and less than B pixels. In this example, the vertical direction in which the adjacent inserted pixel is apart from the target pixel in the staggered form is reversed between the plus direction and the minus direction by one pixel. The vertical directions in which both of two pixels adjacent to the target inserted pixel 31a in the horizontal direction are apart from the target inserted pixel 31a are the same direction.

As the specific values of A pixels and the B pixels, for example, in case of the resolution of 1200 dpi, it is preferable that A is 2 (pixels) and B is 80 (pixels). If A and B are set as described above, the maximum distance in the sub-scanning direction between two pixel inserting positions adjacent in the main scanning direction is 0.848 mm (=80×212 µm). Therefore, the texture is not very conspicuous. In case of the resolution of 600 dpi, it is preferable that A is 2 (pixels) and B is 40 (pixels). Because it is necessary that the adjacent pixel inserting positions are not connected to each other in the sub-scanning direction, A is set to 2 at the minimum.

Figure 19A:
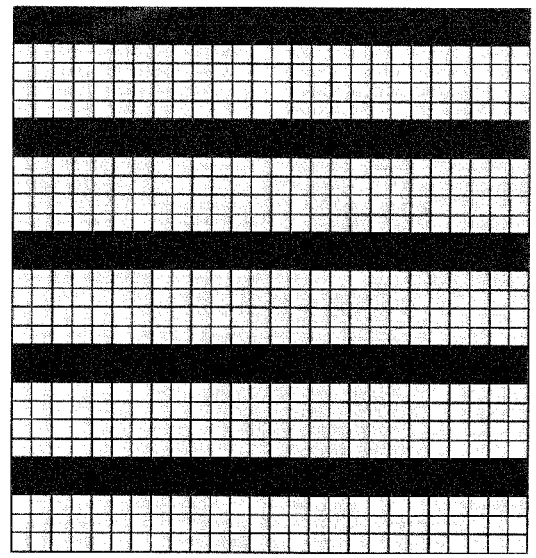
FIG. 19A is the original image in which the stripes are arranged.
Figure 19B:
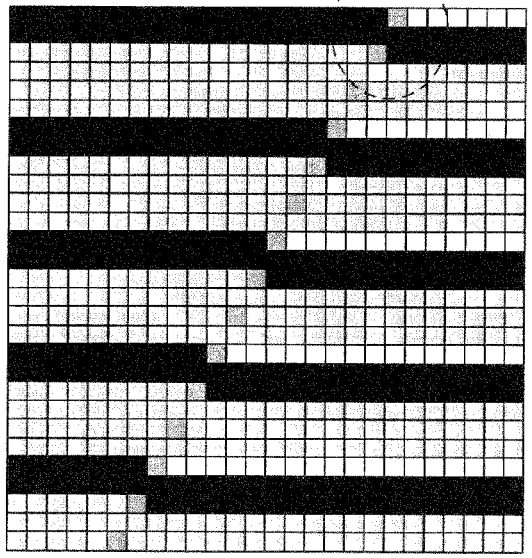
FIG. 19B is an explanatory view showing the image defect caused when the enlargement process is carried out at the pixel inserting positions in the state that the distance between the two adjacent inserted pixels is limited to two pixels.

Further, when the above number n denoting the interval at which the vertical direction in which the adjacent inserted pixel is apart from the target pixel in the staggered form is reversed is large, the inserted pixels are arranged in the staggered form in which the inserted pixels are apart from the target pixel in the same direction (one of the plus direction and the minus direction) consecutively. In case that the number n of the above consecutive times is increased, the steps (discontinuity) caused by the inserted pixels are conspicuous in the horizontal direction and the like as shown in FIG. 19B, FIG. 20C and FIG. 20D. Therefore, it is preferable that the number n of the above consecutive times is limited to two or less (two consecutive pixels in the horizontal direction) (See FIG. 5).

Figure 5:
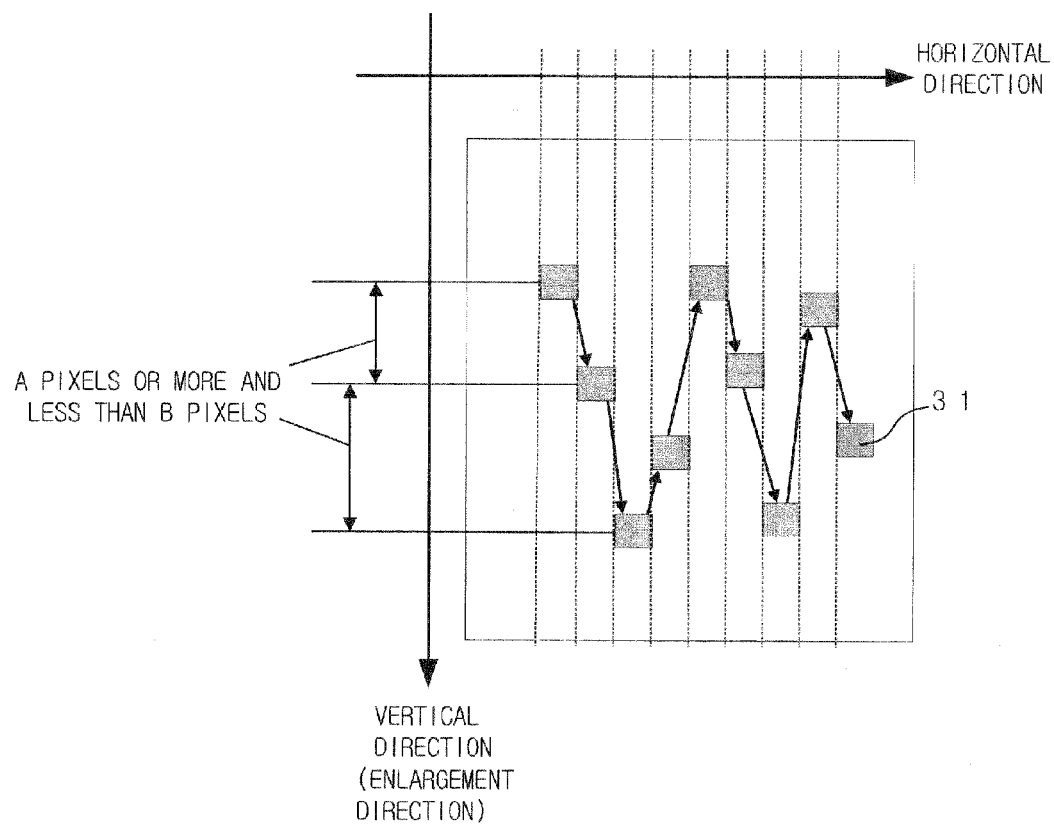
FIG. 5 is an explanatory view showing an example of the arrangement of the inserted pixels in case that the reverse period of the staggered form is two pixels.

FIG. 5 shows an example of the arrangement of the inserted pixels in case that the reverse interval of the staggered form in the vertical direction is two consecutive pixels in the horizontal direction. In this case, the distance in the vertical direction (sub-scanning direction) between the two inserted pixels which are adjacent in the horizontal direction (main scanning direction) is necessarily A pixels or more and less than B pixels.

Figure 6:
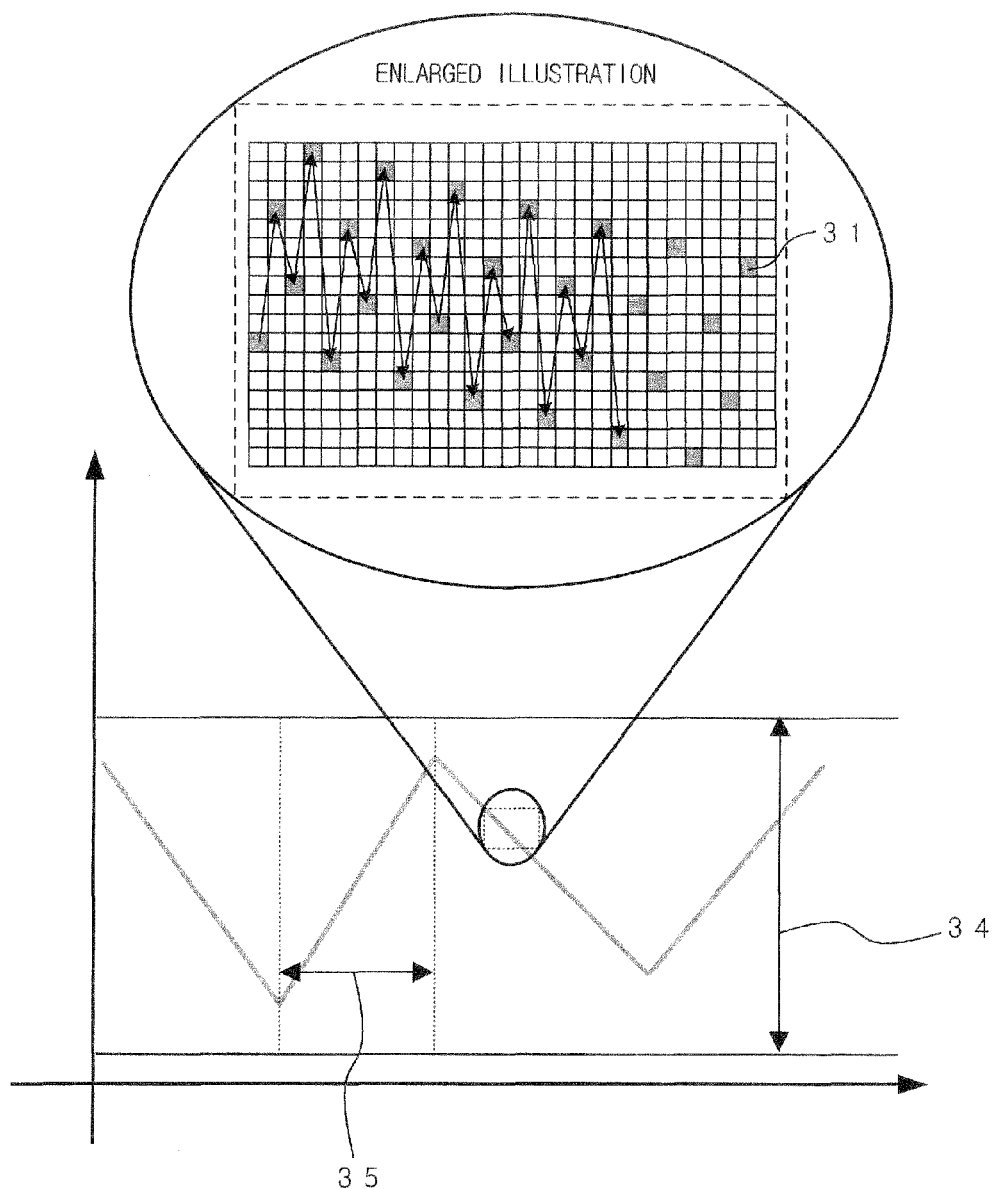
FIG. 6 is an explanatory view showing the arrangement of the inserted pixels macroscopically (showing a part of the arrangement microscopically) in accordance with the image processing method (pixel inserting method) according to the embodiment.

FIG. 6 shows an example of the arrangement of the inserted pixels macroscopically according to the embodiment. In FIG. 6, while the above macroscopic arrangement includes the staggered form having small fluctuations at a short cycle (the microscopic arrangement of the inserted pixels according to the embodiment), when the arrangement is viewed macroscopically, the inserted pixels are arranged so as to form the macroscopic staggered form having large fluctuations at a long cycle in the above macroscopic arrangement. The angles of the slopes in the macroscopic staggered form, that is, the angles of the slopes of the central line of the macroscopic arrangement of the inserted pixels are not coincident with the screen angle, because the screen easily interferes with the above arrangement.

Figure 7:
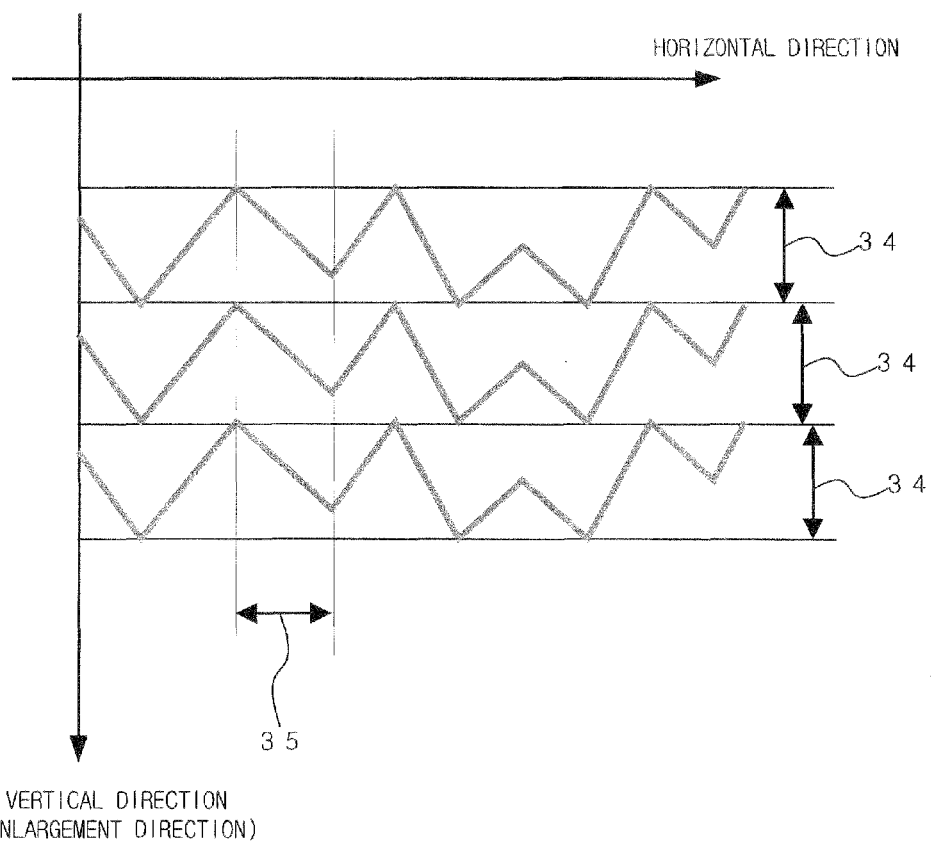
FIG. 7 is an explanatory view showing the arrangement of the inserted pixels in three interpolation cycles macroscopically in accordance with the image processing method (pixel inserting method) according to the embodiment.

The macroscopic staggered form is contained in the interpolation cycle 34 which is determined in accordance with the enlargement ratio or the reduction ratio of the image. FIG. 7 is a view showing the macroscopic staggered forms as shown in FIG. 6. In FIG. 7, the macroscopic staggered forms are contained in each of three consecutive interpolation cycles 34. The arrangement of the pixels in one interpolation cycle 34 is the same as the arrangement in the other interpolation cycles 34. Therefore, in each interpolation cycle 34, the same macroscopic staggered form is repeated.

In this embodiment, the period in which the slope in the macroscopic staggered form is reversed between the plus and the minus (in the vertical direction) is referred to as the macroscopic period 35. It is preferable that the macroscopic period 35 is longer. For example, the macroscopic period 35 can be set to the period from one end of the image to the other end thereof in the horizontal direction. In this case, the arrangement of the inserted pixels forms a slope line from one end of the image to the other end thereof in the horizontal direction macroscopically.

Hereinafter, a specific example of the enlargement/reduction of the image, which is carried out by the pixel inserting process in the image processing method according to the embodiment, will be explained as compared with the conventional pixel inserting process.

Figure 8A:
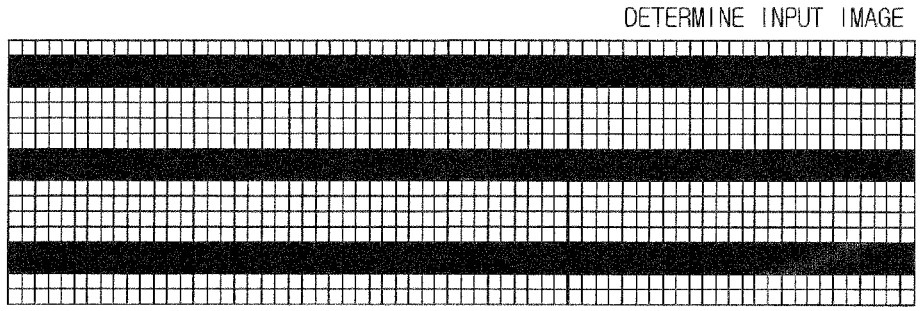
FIGS. 8A to 8D are explanatory views showing the specific example of the pixel insertion carried out by using the image processing method (pixel inserting method) according to the embodiment.
Figure 8B:
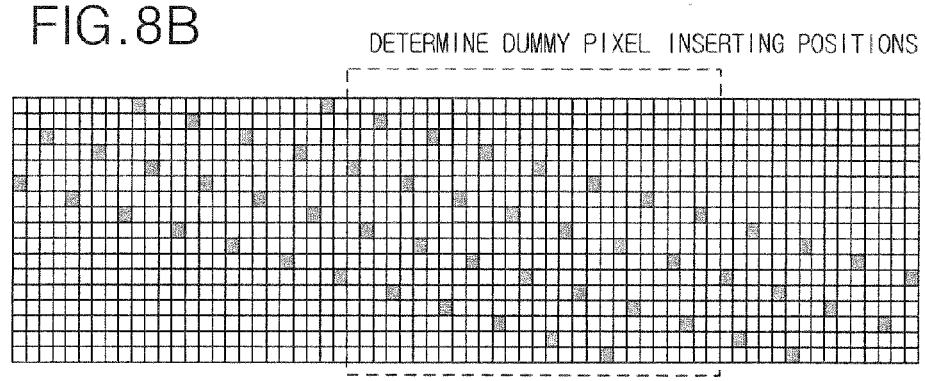
Figure 8C:
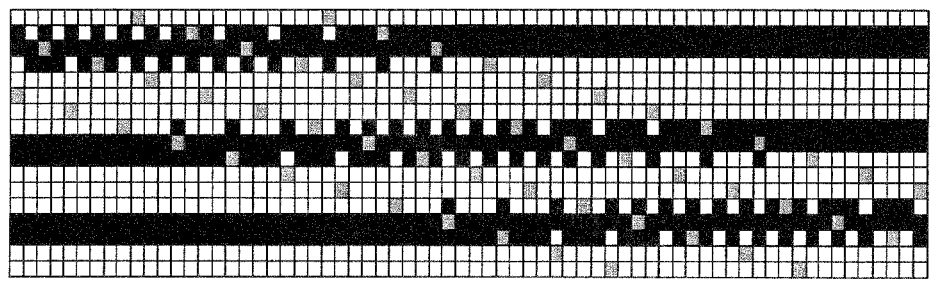
Figure 8D:
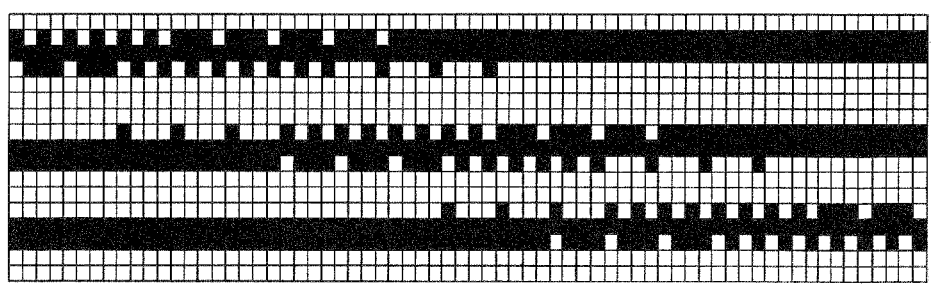

FIGS. 8A to 8D show the specific example of the pixel insertion carried out by using the image processing method according to the embodiment. FIG. 8A shows the input image in which the horizontal lines are arranged. FIG. 8B shows the arrangement of the dummy pixels. FIG. 8C shows the state in which the dummy pixels are inserted in the input image in accordance with the arrangement of FIG. 8B. FIG. 8D shows the state in which each pixel value of the dummy pixels is set to the pixel value corresponding to the peripheral pixels of the dummy pixel.

As shown in FIG. 8B, each inserting position of the dummy pixels is arranged in the staggered form so as to reverse the vertical direction in which one dummy pixel is apart from the dummy pixel adjacent to the one dummy pixel between the plus direction and the minus direction by not more than two pixels in the horizontal direction. Further, in the staggered form, the distance in the vertical direction between the pixel inserting positions adjacent in the horizontal direction is 2 pixels or more and 10 pixels or less.

As shown in FIG. 8D, in the state in which the pixel inserting process is finished, it would appear that the unevenness is caused on the outline of the horizontal line and the image deterioration is caused. However, when the image is developed on the basis of this data by the electrophotographic process, the unevenness is smoothed and the discontinuity in the image is not conspicuous.

On the other hand, FIGS. 20A to 20D show the case in which the pixels are inserted by the conventional process. FIG. 20A shows the input image which is the same as that of FIG. 8A. FIG. 20B shows the arrangement of the dummy pixels. FIG. 20C shows the state in which the dummy pixels are inserted in the input image in accordance with the arrangement of FIG. 20B. FIG. 20D shows the state (pixel insertion finish state) in which each pixel value of the dummy pixels is set to the pixel value corresponding to the peripheral pixels of the dummy pixel.

In the conventional process, each inserting position of the dummy pixels is arranged so as to ramp down the pixel inserting positions from the left upper portion of the image by one pixel at intervals of four pixels in the horizontal direction. In this process, as shown in FIG. 20D, the discontinuity is caused in the horizontal lines at the point at which the pixel inserting position is ramped down by one pixel in the vertical direction. That is, the thickened part in which the horizontal line is thickened by one pixel is caused and the steps are caused.

Next, the process which is carried out when the pixels are inserted by the pixel inserting method according to the embodiment, will be explained.

Figure 9A:
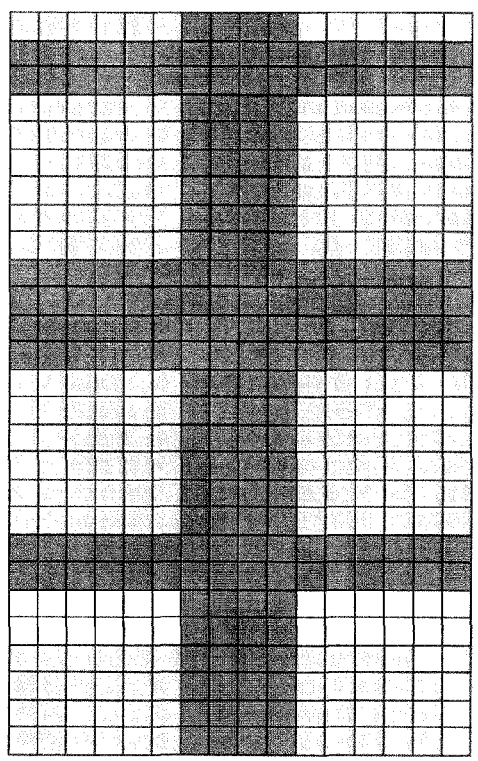
FIG. 9A is an explanatory view showing an input image to be processed by using the image processing method (pixel inserting method) according to the embodiment.
Figure 9B:
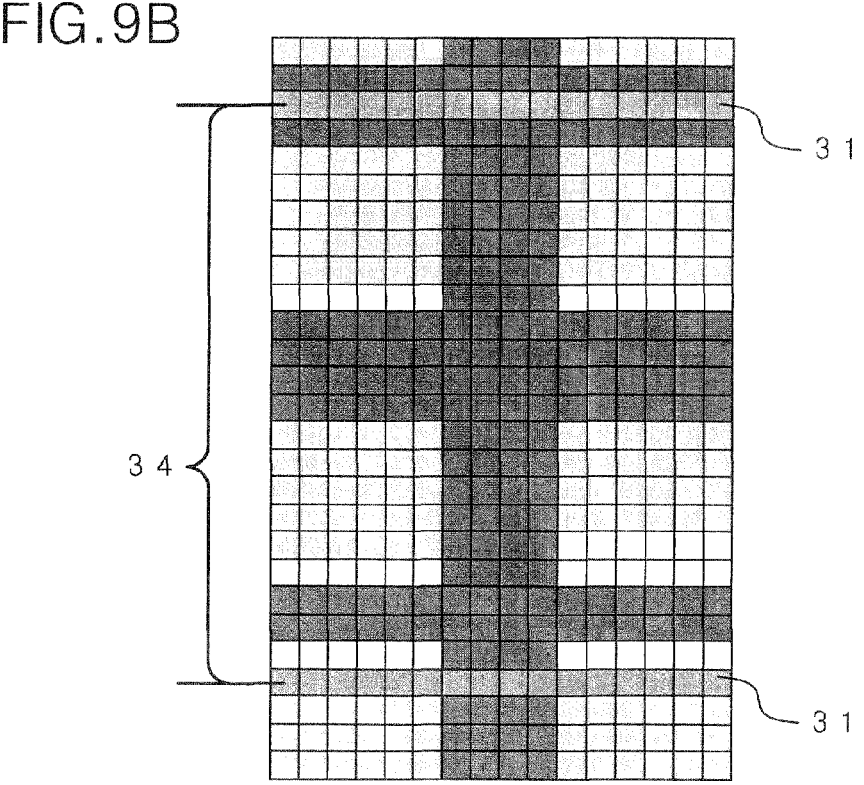
FIG. 9B is an explanatory view showing an image in which the dummy pixels are inserted into the input image on the lines in the interpolation cycles
Figure 10A:
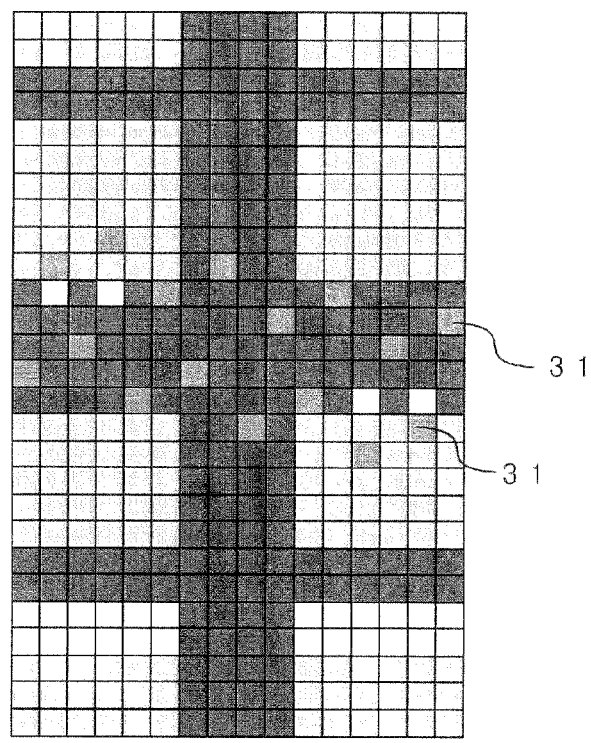
FIG. 10A is an explanatory view showing the state in which the dummy pixels of FIG. 9B are shifted.
Figure 10B:
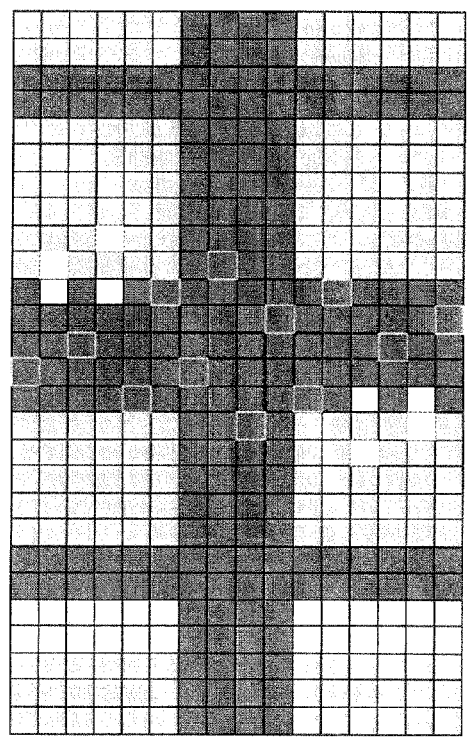
FIG. 10B is an explanatory view showing the image in which the process for determining the pixel value of each shifted dummy pixel is finished.
Figure 12:
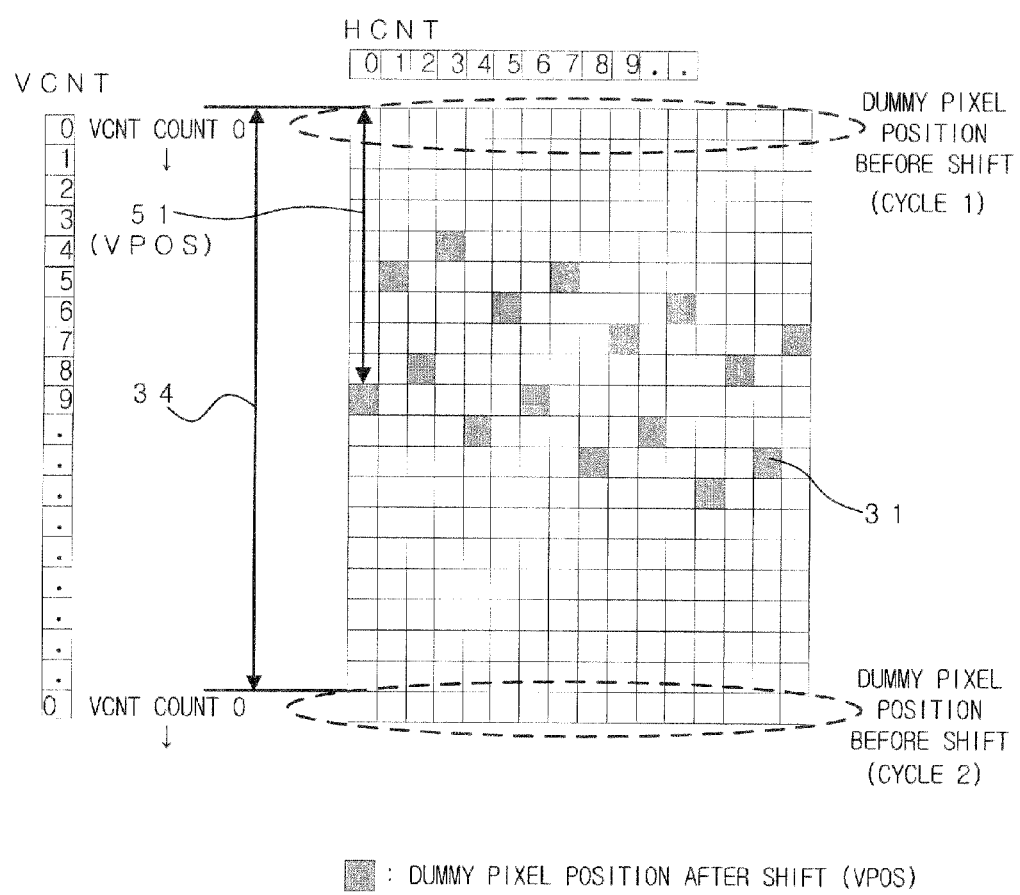
FIG. 12 is an explanatory view showing an example of the relation among the horizontal position (HCNT) of the pixel, the vertical position (VCNT) of the pixel and the dummy pixel position (VPOS)

FIG. 9A shows the original image (input image) in which the pixels are not inserted. When the pixels are inserted, the dummy pixels are inserted linearly in the horizontal direction (FIG. 9B). At this time, the dummy pixels which are inserted linearly are inserted at the regular intervals (interpolation cycle 34) in the vertical direction in accordance with the enlargement ratio of the image or the reduction ratio thereof. The inserting position of each dummy pixel is treated as the provisional arrangement position. In the next process, each position of the dummy pixels is shifted in the vertical direction (See FIG. 10A showing the state in which the dummy pixels are shifted). At this time, the shift width (shift width 51 shown in FIG. 12) is adjusted in each dummy pixel and the dummy pixels are shifted so as to arrange the inserted pixels according to the embodiment. Each shifted position is treated as the final arrangement position. Then, as shown in FIG. 10B, the pixel value of each dummy pixel is determined in accordance with the pixel value corresponding to the peripheral pixels of the dummy pixel. The pixel inserting process is ended.

In case that the image is enlarged, the dummy line inserting unit 26 shown in FIG. 2 carries out the process for inserting one line dummy pixels at the regular intervals (interpolation cycle 34) in the vertical direction in accordance with the enlargement ratio of the image (See FIG. 9B). The pixel insertion processing unit 40 carries out the process for shifting the position of each dummy pixel. Herein, the example of the configuration of the pixel insertion processing unit 40 and the operation thereof will be explained.

Figure 11:
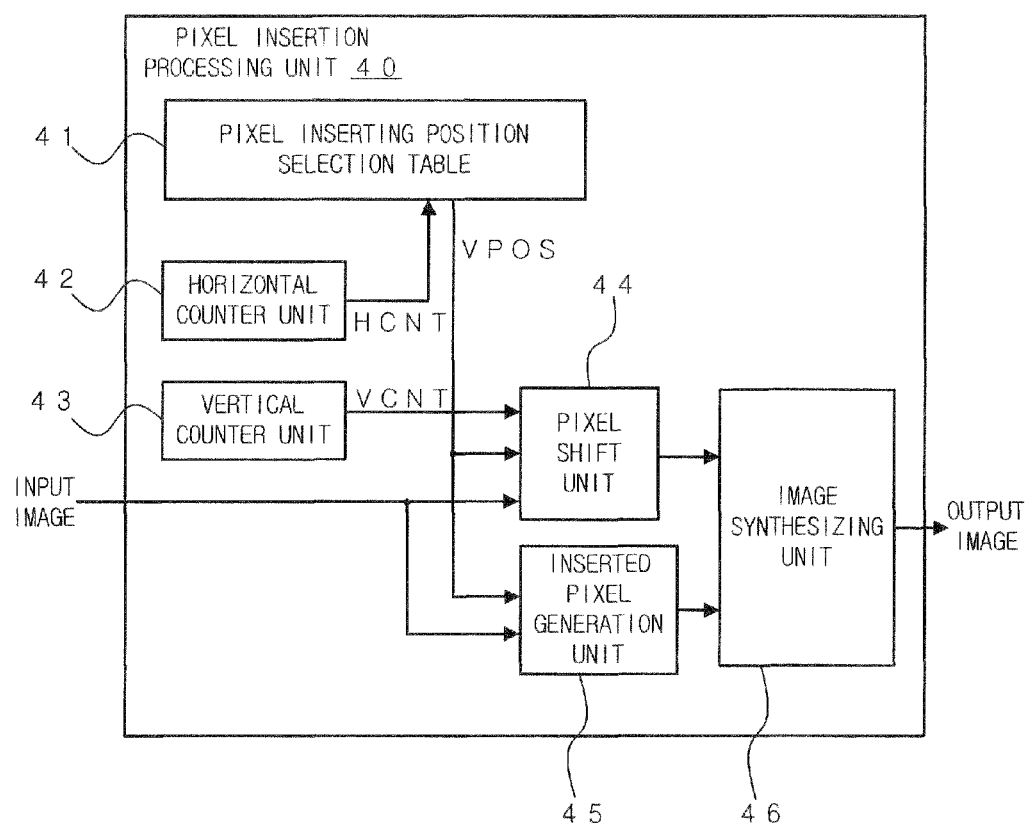
FIG. 11 is a block diagram showing a schematic configuration of the pixel insertion processing unit.

FIG. 11 shows the schematic configuration of the pixel insertion processing unit 40. The pixel insertion processing unit 40 comprises a pixel inserting position selection table 41, a horizontal counter unit 42, a vertical counter unit 43, a pixel shift unit 44, an inserted pixel generation unit 45 and an image synthesizing unit 46. In this explanation, the input image is an image in which the dummy pixels are inserted by the dummy line inserting unit 26 shown in FIG. 2. The specific example of the input image is shown in FIG. 9B. The input image is input from the left end pixel of the first line to the right end pixel of the first line sequentially pixel by pixel. When the right end pixel of the first line is input, the input image is input from the left end pixel of the next line to the right end pixel of the next line sequentially pixel by pixel. Then, the input image is input by repeating the above input sequentially.

The vertical counter unit 43 counts the position of the pixel in the vertical direction of the input image, and outputs the position information as vertical position information (VCNT). The vertical counter unit 43 counts the position in the vertical direction and outputs the vertical position information (VCNT) by setting the position of the horizontal line in which the dummy pixels are inserted in the input image before the dummy pixels are shifted, to "0" in the vertical direction. Further, the vertical counter unit 43 returns to 0 in the position of the horizontal line in the interpolation cycle 34 (See FIG. 12).

The horizontal counter unit 42 counts the position of the pixel of the input image in the horizontal direction, and outputs the position information as horizontal position information (HCNT). The vertical counter unit 42 counts up the count value (HCNT) by +1 every when the one pixel is input. Further, when the VCNT increases by +1, the count value (HCNT) is reset.

Figure 13:
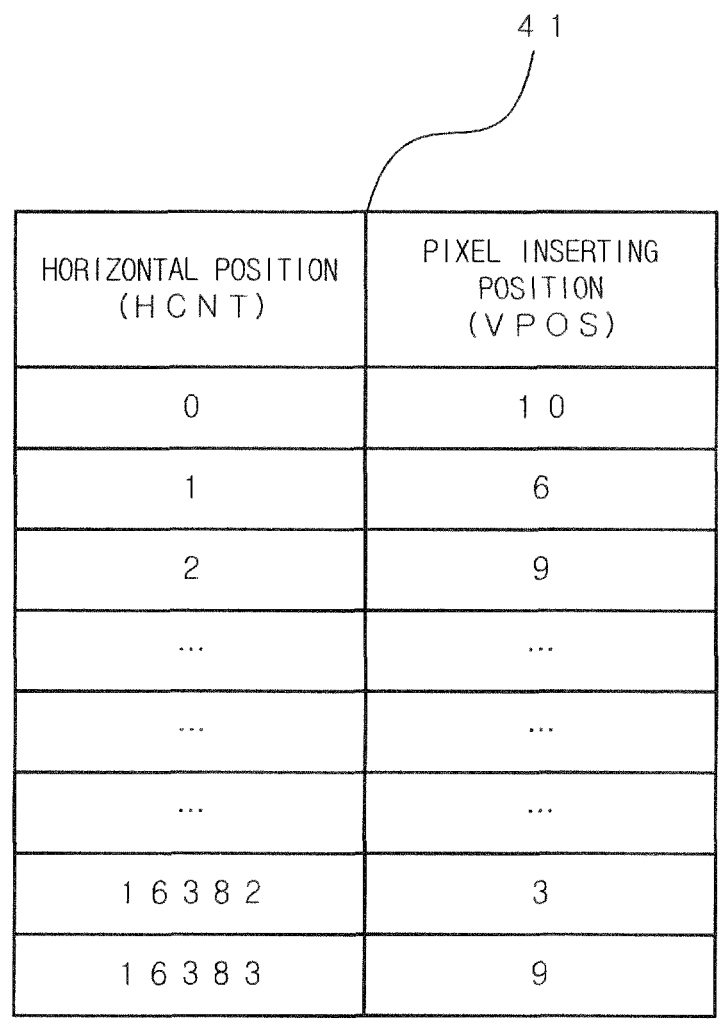
FIG. 13 is an explanatory view showing an example of the pixel inserting position selection table.
Figure 16:
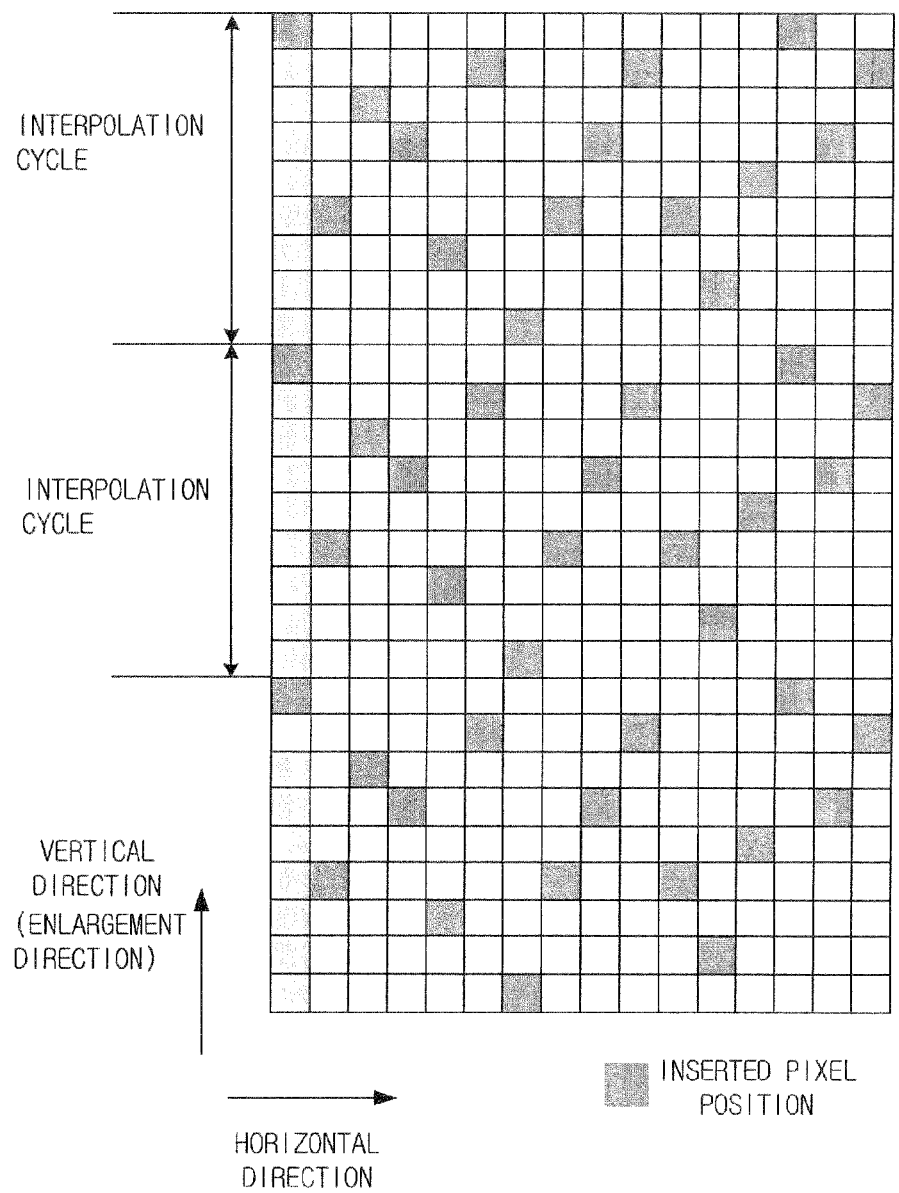
FIG. 16 is an explanatory view showing an example of the pixel inserting positions determined by the pseudorandom numbers.
Figure 17A:
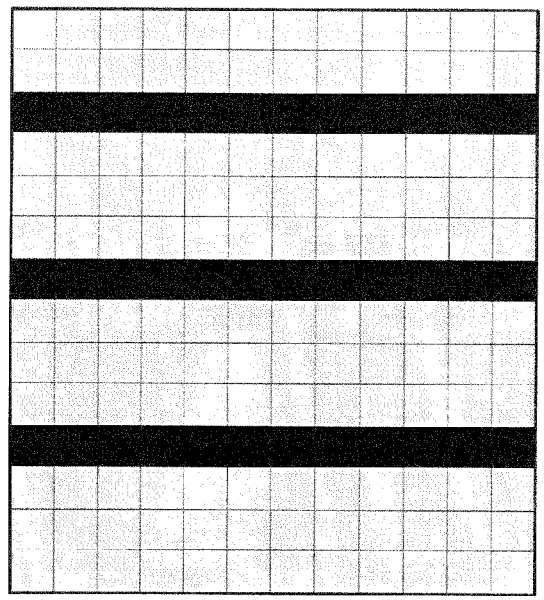
FIG. 17A is the original image in which the stripes are arranged.
Figure 17B:
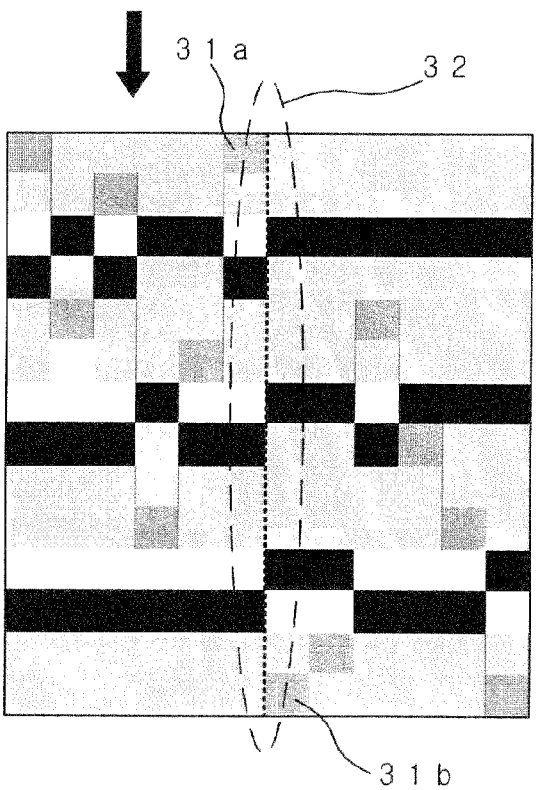
FIG. 17B is an explanatory view showing an image defect caused by carrying out the enlargement process at the pixel inserting positions determined by the pseudorandom numbers.
Figure 18:
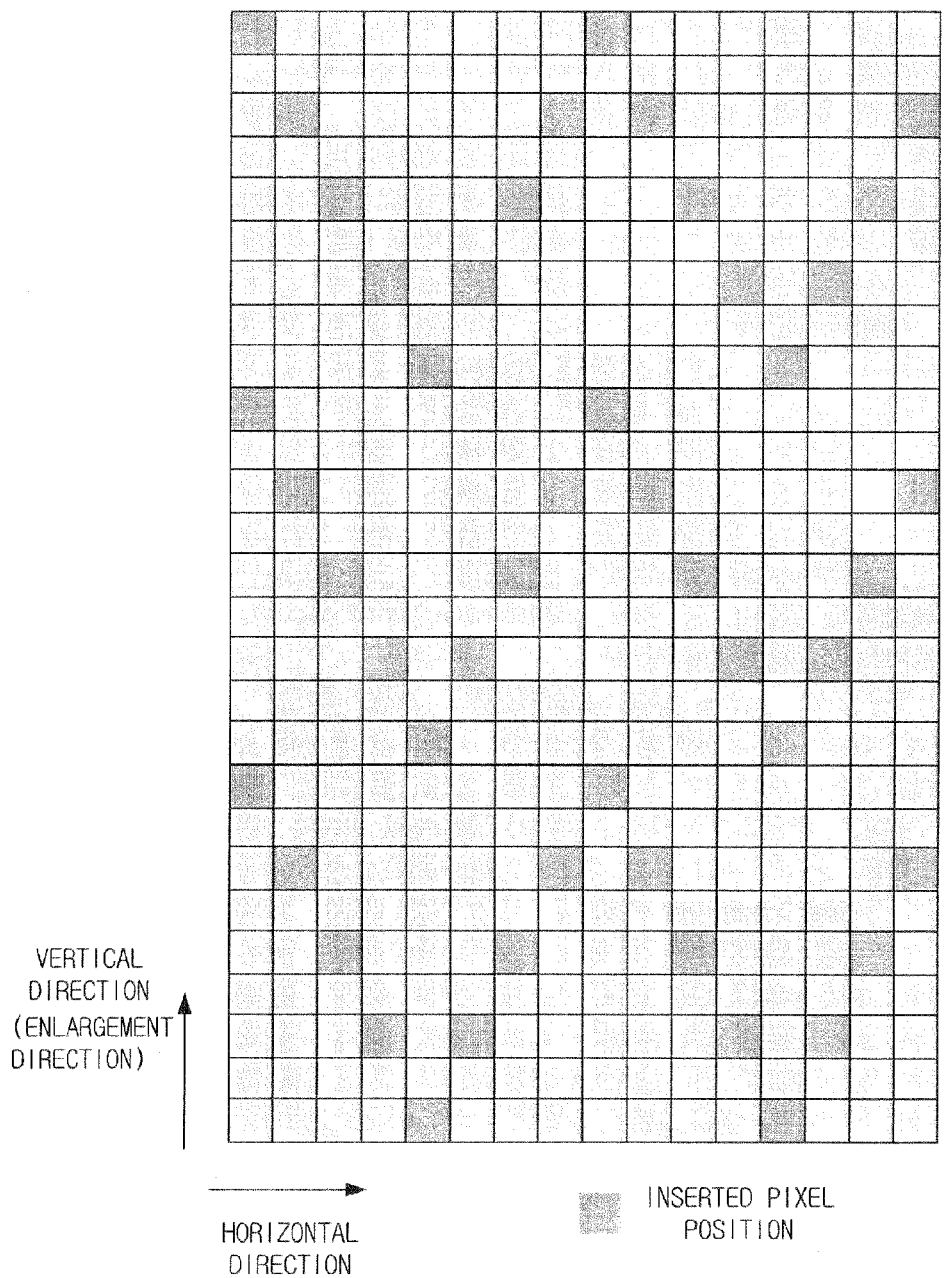
FIG. 18 is an explanatory view showing an example of the arrangement of the pixel inserting positions in case that the adjacent pixel inserting positions are limited within a certain range.

The pixel inserting position selection table 41 (See FIG. 13) is a lookup table for storing the pixel inserting position information (VPOS) in the vertical direction with respect to each horizontal position (HCNT). The pixel inserting position selection table 41 is previously set so as to realize the pixel inserting position pattern according to the embodiment. When the horizontal position information (HCNT) output from the horizontal counter unit 42 is input in the pixel inserting position selection table 41, the corresponding pixel inserting position information (VPOS) is output.

The pixel shift unit 44 adjusts the arrangement of the pixels of the image based on the values of VPOS and VCNT. Specifically, the arrangement of the pixels is adjusted in accordance with the following three rules.

1. In case of VPOS<VCNT, the position of the pixel is not changed and the pixel is output to the position which is not changed.

2. In case of VPOS=VCNT, the dummy pixel is output to the position which is indicated by the position information. (Thereby, the position of the dummy pixel is shifted and the pixel inserting position is determined.)

3. In case of VPOS>VCNT, the position of the pixel is shifted in the vertical direction by minus one pixel.

Thereby, the dummy pixels are shifted from the provisional inserting positions shown in FIG. 9B to the positions shown in FIG. 10A. Then, the final pixel inserting positions are determined (See FIG. 12).

The inserted pixel generation unit 45 determines the pixel value of the dummy pixel incase of VPOS=VCNT. The pixel value is determined by using the average value of the pixel values of the adjacent pixels in the vertical direction or by copying the pixel value of the adjacent pixel.

The image synthesizing unit 46 synthesizes an image. Specifically, in case of the pixels except the dummy pixels among the pixels transmitted from the pixel shift unit 44 (in case of VPOS<VCNT or in case of VPOS>VCNT), the pixel transmitted from the pixel shift unit 44 is output. In case of the dummy pixel (in case of VPOS=VCNT), the pixel having the pixel value determined by the inserted pixel generation unit 45 is output. Thereby, the image which is finely enlarged is output from the image synthesizing unit 46.

As described above, in the embodiment, when the image is finely enlarged in the vertical direction by inserting the pixels, the distance between the inserted pixels adjacent in the horizontal direction (the difference in the positions of the adjacent pixels) is limited within the range (A pixels or more and less than B pixels) in which the texture is not easily caused. Further, each inserting position of the pixels is determined so as to arrange the inserted pixels in the staggered form in which the direction in which the one pixel is apart from the adjacent pixel is reversed at intervals of two pixels at the maximum in the horizontal direction. Thereby, it is possible to finely enlarge the image so as to minimize the image deterioration, such as the streaky texture, the discontinuity which is caused in the horizontal line, or the like.

Next, the case in which an image is reduced will be explained. In this case, the image is reduced in the sub-scanning direction. In case that the image is reduced by deleting pixels, the positions of the pixels to be deleted are determined in accordance with the same rule as the case in which the inserted pixel positions are determined when the image is enlarged. That is, the difference (distance) in the pixel positions in the vertical direction between pixels to be deleted, which are adjacent in the horizontal direction is limited within the range (A pixels or more and less than B pixels) in which the texture is not easily caused. Further, the pixel positions of the pixels to be deleted are designated so as to arrange the pixels to be deleted in the staggered form in which the direction in which the one pixel to be deleted is apart from the adjacent pixel to be deleted is reversed between the plus direction and the minus direction at intervals of two pixels at the maximum in the horizontal direction. Therefore, it is possible to minimize the image deterioration when the image is reduced.

Next, the process for reducing the image will be explained in detail. In case that the image is reduced, the dummy line inserting unit 26 designates the pixels to be deleted, which constitute one line along the horizontal direction at the regular intervals (interpolation cycle 34) in the vertical direction in accordance with the reduction ratio of the image, instead of the process for inserting the dummy pixels when the image is enlarged. The image in which the pixels to be deleted are designated is input to the pixel insertion processing unit 40 as the input image.

The horizontal counter unit 42 outputs the horizontal position information (HCNT) from the input image. The vertical counter unit 43 outputs the vertical position information (VCNT) from the input image. The VCNT is counted up from 0 in the interpolation cycle 34 (At the pixel to be deleted, the VCNT is reset to 0.). Further, the pixel inserting position selection table 41 outputs the corresponding VPOS (in case of the image reduction, the pixel deleting position information) in accordance with the HCNT output by the horizontal counter unit 42. The lookup table used in the pixel inserting position selection table 41 may be the same as one used when the image is enlarged.

Next, the pixel shift unit 44 adjusts the arrangement of the pixels of the image based on the values of VPOS and VCNT. Specifically, the arrangement of the pixels is adjusted in accordance with the following three rules.

1. In case of VPOS<VCNT, the position of the pixel is shifted in the vertical direction by plus one pixel.
2. In case of VPOS=VCNT, the dummy pixel is output to the position which is indicated by the position information.
3. In case of VPOS>VCNT, the position of the pixel is not changed and the pixel is output to the position which is not changed.

In case that the image is reduced, each pixel value of the peripheral pixels of the deleted pixel may be adjusted in accordance with the pixel value of the deleted pixel.

As described above, the embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

In the embodiment, the enlargement/reduction of the image in the sub-scanning direction is explained. However, in case of the enlargement/reduction process for enlarging/reducing an image in the main scanning direction, only the direction is changed between the sub-scanning direction and the main scanning direction and the same process may be carried out basically.

One of the objects of the above embodiment is to provide an image processing apparatus and an image processing method, which can carry out the enlargement/reduction of an image by inserting or deleting pixels so as to minimize the occurrence of the texture and the discontinuity of the line segment.

In the above embodiment, the operation pixels which are inserted or deleted in order to enlarge or reduce the image in the first direction (for example, the sub-scanning direction) are arranged in the staggered form from one end of the image to the other end of the image in the second direction (for example, the main scanning direction) which is perpendicular to the first direction, so as to satisfy the following two conditions:

(1) A distance in the first direction between the operation pixels adjacent in the second direction is 2 pixels or more and less than the predetermined number of pixels, and (2) A direction in which the operation pixels adjacent in the second direction are apart from each other is reversed at intervals of not more than 2 pixels in the second direction. Thereby, when the enlargement/reduction process is carried out for the image by inserting or deleting the operation pixels, it is possible to minimize the image deterioration, such as the streaky texture, the discontinuity which is caused in the line segment in the second direction, or the like. That is, by satisfying the above condition (1), it is possible to minimize the occurrence of the streaky texture caused by the overlong pixel inserting cycle (or the overlong pixel deleting cycle) By satisfying the above condition (2), it is possible to minimize the discontinuity which is caused in the line segment in the second direction.

In the above embodiment, because the range in which the operation pixels are arranged in the staggered form in the first direction is limited within the interpolation cycle, each pixel position of the operation pixels can be arranged in the staggered form without influencing the operation pixels mutually which are arranged in adjacent interpolation cycles. The process for arranging the operation pixels in the staggered form can be simplified.

In the above embodiment, when the operation pixels are arranged in the staggered form, the central line of the macroscopic arrangement of the operation pixels is sloped from one end of the image to the other end of the image in the second direction. Alternatively, the central line of the macroscopic arrangement of the operation pixels is waved in a period which is longer than a period of the staggered form. Therefore, while the above two conditions (1) and (2) are satisfied, the operation pixels can be arranged widely in the interpolation cycle. Further, it is possible to obscure the image quality deterioration more.

In the above embodiment, in case that the image to be enlarged or reduced is an image for which the screen treatment is carried out in order to express the halftone, the image processing apparatus controls the slope of the central line of the arrangement of the operation pixels (the slope of the macroscopic staggered form) so as not to be coincident with the screen angle of the image. Therefore, it is possible to suppress the image quality deterioration caused by the interference with the screen.

In the above embodiment, the predetermined number of pixel which is the upper limit of the distance in the first direction between the operation pixels adjacent in the second direction, is set to the value corresponding to the resolution of the image. That is, as the resolution of the image is high, the predetermined number of pixel becomes large. The distance corresponding to the predetermined number of pixels on the actual image is fixed without depending on the resolution.

In the above embodiment, the upper limit of the predetermined number of pixels is set to the number of pixels, which is calculated from the resolution of the image so as to satisfy a ratio of the number of pixels of 80 pixels to the resolution of the image of 1200 dpi. Therefore, for example, in case that the resolution of the image is 600 dpi, the upper limit of the predetermined number of pixels is set to 40 pixels.

According to the image processing apparatus and the image processing method, in the enlargement/reduction process which is carried out for the image by inserting or deleting the pixels, it is possible to minimize the image quality deterioration caused by the occurrence of the texture and the discontinuity of the line segment.

What is claimed is:

1. An image processing apparatus for enlarging or reducing an image in a first direction by inserting operation pixels in the image or by deleting operation pixels from the image, the image having a dot matrix format in which pixels are arranged in the first direction and in a second direction which is perpendicular to the first direction, the image processing apparatus comprising:
    an operation pixel arrangement unit to arrange the operation pixels to be inserted or deleted in a staggered form from one end of the image to the other end of the image in the second direction such that operation pixels which are adjacent in the second direction are apart from each other in a plus direction or a minus direction along the first direction, so as to satisfy a first condition in which a distance in the plus direction or the minus direction along the first direction between the operation pixels adjacent in the second direction is 2 pixels or more and less than a predetermined number of pixels, and a second condition in which the plus direction or the minus direction along the first direction in which the operation pixels adjacent in the second direction are apart from each other is reversed to the other of the plus direction and the minus direction at intervals of not more than 2 pixels which are consecutive in the second direction; and
    an image enlargement/reduction unit to enlarge or reduce the image by inserting or deleting the operation pixels arranged by the operation pixel arrangement unit.

2. The image processing apparatus of claim 1, wherein a range in which the operation pixels are arranged in the staggered form in the first direction is determined within an insertion/deletion cycle in which the operation pixels are inserted or deleted in the first direction, wherein the insertion/deletion cycle corresponds to an enlargement/reduction ratio of the image.

3. The image processing apparatus of claim 1, wherein each operation pixel is arranged such that a central line of a macroscopic arrangement of the operation pixels is sloped from the one end of the image to the other end of the image in the second direction or such that the central line of the macroscopic arrangement of the operation pixels is waved in a period which is longer than a period of the staggered form.

4. The image processing apparatus of claim 3, wherein a slope of the central line of the macroscopic arrangement is not coincident with a screen angle of the image, or each slope angle of the waved central line of the macroscopic arrangement is not coincident with the screen angle of the image.

5. The image processing apparatus of claim 1, wherein the predetermined number of pixels is a value corresponding to a resolution of the image.

6. The image processing apparatus of claim 5, wherein an upper limit of the predetermined number of pixels is set to the number of pixels, which is calculated from the resolution of the image so as to satisfy a ratio of the number of pixels of 80 pixels to the resolution of the image of 1200 dpi.

7. An image processing method for enlarging or reducing an image in a first direction by inserting operation pixels in the image or by deleting operation pixels from the image, the image having a dot matrix format in which pixels are arranged in the first direction and in a second direction which is perpendicular to the first direction, the image processing method comprising:
    arranging the operation pixels to be inserted or deleted in a staggered form from one end of the image to the other end of the image in the second direction such that operation pixels which are adjacent in the second direction are apart from each other in a plus direction or a minus direction along the first direction, so as to satisfy a first condition in which a distance in the plus direction or the minus direction along the first direction between the operation pixels adjacent in the second direction is 2 pixels or more and less than a predetermined number of pixels, and a second condition in which the plus direction or the minus direction along the first direction in which the operation pixels adjacent in the second direction are apart from each other is reversed to the other of the plus direction and the minus direction at intervals of not more than 2 pixels which are consecutive in the second direction; and
    enlarging or reducing the image by inserting or deleting the arranged operation pixels.

8. The image processing method of claim 7, wherein a range in which the operation pixels are arranged in the staggered form in the first direction is determined within an insertion/deletion cycle in which the operation pixels are inserted or deleted in the first direction, wherein the insertion/deletion cycle corresponds to an enlargement/reduction ratio of the image.

9. The image processing method of claim 7, wherein each operation pixel is arranged such that a central line of a macroscopic arrangement of the operation pixels is sloped from the one end of the image to the other end of the image in the second direction or such that the central line of the macroscopic arrangement of the operation pixels is waved in a period which is longer than a period of the staggered form.

10. The image processing method of claim 9, wherein a slope of the central line of the macroscopic arrangement is not coincident with a screen angle of the image, or each slope angle of the waved central line of the macroscopic arrangement is not coincident with the screen angle of the image.

11. The image processing method of claim 7, wherein the predetermined number of pixels is a value corresponding to a resolution of the image.

12. The image processing method of claim 11, wherein an upper limit of the predetermined number of pixels is set to the number of pixels, which is calculated from the resolution of the image so as to satisfy a ratio of the number of pixels of 80 pixels to the resolution of the image of 1200 dpi.

* * * * *